United States Patent [19]
Vadlamani et al.

[11] Patent Number: 5,556,655
[45] Date of Patent: Sep. 17, 1996

[54] METAL ION COMPOSITIONS AND METHODS FOR IMPROVING WHEAT-BASED PRODUCTS

[75] Inventors: Keswara R. Vadlamani; Paul A. Seib, both of Manhattan, Kans.

[73] Assignee: Kansas State University Research Foundation, Manhattan, Kans.

[21] Appl. No.: 519,243

[22] Filed: Aug. 25, 1995

Related U.S. Application Data

[63] Continuation-in-part of Ser. No. 382,986, Feb. 3, 1995, abandoned.

[51] Int. Cl.⁶ .................................................. A23L 1/272
[52] U.S. Cl. .................... 426/270; 426/262; 426/331; 426/557; 426/656

[58] Field of Search .................................. 426/331, 262, 426/270, 557, 656

*Primary Examiner*—Helen Pratt
*Attorney, Agent, or Firm*—Hovey, Williams, Timmons & Collins

[57] ABSTRACT

Wheat-based products of improved brightness such as noodles, pastas, doughs and vital wheat gluten are provided which include a source of $Zn^{+2}$ ion, most preferably zinc chloride, and/or a source of $Al^{+3}$ ion, most preferably aluminum sulfate. The $Zn^{+2}$ and/or $Al^{+3}$ source is added to the starting ingredients and serves to give bright products less prone to show browning off-color. $Zn^{+2}$ and/or $Al^{+3}$ ion also permits preparation of aqueous gluten dispersions without the need for contaminating acids or bases.

83 Claims, 1 Drawing Sheet

METAL ION COMPOSITIONS AND METHODS FOR IMPROVING WHEAT-BASED PRODUCTS

RELATED APPLICATION

This is a continuation-in-part of application Ser. No. 08/382,986 filed Feb. 3, 1995 now abandoned.

BACKGROUND OF THE INVENTION

1. Field of the Invention

The present invention is broadly concerned with improved wheat-derived components or products which are mixed with a source of $Zn_{+2}$ and/or $Al^{+3}$ ion to alter the properties thereof. More particularly, the invention pertains to such products, and particularly noodles, pastas, doughs and gluten, which are essentially free of chlorophyll and are preferably treated with zinc chloride and/or aluminum sulfate in order to overcome characteristic browning and/or create novel products.

2. Description of the Prior Art

One common type of food spoilage is caused by enzymatic browning. Perhaps the most well-recognized instance of enzymatic browning occurs when fruits or vegetables are cut, bruised or diseased. The disruption of the native structure allows phenolic compounds to combine with native phenolase enzyme which, in the presence of air, rapidly oxidizes the phenolics and causes tissue darkening.

Enzymatic browning of wheat-based foods or components is less well-recognized, but is common nevertheless. The appearance of noodles, pastas, wheat gluten and raw doughs such as biscuits and rolls are all affected by the extent of browning during processing and storage. The bran content of such products contains a high concentration of the phenolase enzyme polyphenol oxidase (PPO), which catalyzes enzymatic browning, particularly in noodles and pastas. While all noodles and pastas suffer from browning discoloration, the problem is especially severe with raw noodles and pastas, which are valued for their unique flavor. Storage of these raw products at room temperature or at refrigerator temperatures causes their color to darken. One response to this problem is to produce noodles and pastas from expensive low extraction flours or well purified farinas and semolinas, which minimizes bran content. However, use of such starting materials significantly increases costs and does not entirely eliminate the problem.

Other dough products which are subject to darkening include raw doughs for biscuits and rolls which are usually refrigerated. Use of the expensive flours commonly used for noodles and pastas is not a realistic alternative for these dough products.

Wheat gluten is the natural protein derived from wheat or wheat flour. When ground wheat kernels (wheat flour) are mixed with water, two native proteins (glutenin and gliadin) combine to form a viscoelastic mass called gluten. Commercial wheat gluten is generally obtained by first forming a flour/water dough or a sheared slurry of flour. The dough is kneaded and washed with copious amounts of water to give a starch-rich slurry and a residual cohesive mass of wet gluten. Alternatively, the sheared slurry of flour is centrifuged to produce A-starch and a protein-concentrate phase, which is further processed to produce B-starch and agglomerated gluten particles that are collected on screens. In either process the resultant gluten mass is carefully dried by spray- or flash-drying methods. Freeze-drying of gluten is used in the laboratory, but is too costly for commercial use.

Dry vital wheat gluten is a free-flowing light tan colored powder containing 75–80% protein. Enzymatic browning is one cause of darkening of wheat gluten, while another is absorption of endogenous flour pigments by the gluten proteins. The dark color of gluten is a problem both with the gluten itself and in certain gluten-supplemented foods, such as extra white rolls, restructured fish and meats, and vegetarian analogs.

A related problem with conventional gluten processing stems from the fact that it is difficult to disperse in water. Oftentimes, volatile acids or bases assist in gluten dispersion; however, those additives remain as impurities in the dried gluten and can affect the flavor, odor or other properties of the final product. Additionally, the vapors from the gluten dryer contain potential pollutants.

The prior art describes the addition of zinc to white flour for nutritional purposes, and one report on the attempted oxidation of bread dough with zinc ion. P. Ranum, *Cereal Chem* 57:70 (1980) reported that 1.65–1.90 mg of zinc must be added to 100 g (14% m.b) of different flours to achieve the target level of 2.2 mg total zinc per 100 g flour. S. H. Rubin, A. Emodi, and L. Scialpi, *Cereal Chem* 54:895 (1977) and A. S. Emodi and L. Scialpi, *Cereal Chem* 57:1 (1980) concluded it was technically feasible to fortify bread with zinc with the target level of zinc added to flour of 2.2 mg/100 g, which was proposed by the Food and Nutrition Board of the National Academy of Sciences in 1974. The target level of fortification is equivalent to ~4.6 mg zinc chloride per 100 g of flour, which is on the order of 0.002% by weight $Zn^{+2}$, based upon the weight of the wheat flour taken as 100%. K. Finney, B. L. Bruinsma, and O. Natsuaki, *Cereal Chem* 69:347 (1992) reported that zinc ion at 0.02–2.4 mg/100 g flour-failed to improve bread volume and crumb grain.

U.S. Pat. No. 4,840,808 describes a method for color preservation of vegetable pasta products wherein fresh green vegetable matter is treated with an aqueous alkaline solution to hydrolyze the methyl and phytyl ester groups of the chlorophyll content thereof, followed by mixing the vegetable matter with flour and selected metal ions including zinc and aluminum cations, and extruding the blend to create a pasta product.

Baking powders are used to produce a number of leavened bakery foods, including layer cakes, chiffon cakes, cake donuts, quick breads, biscuits, muffins, tortillas, pancakes and waffles. They are also used to produce self-rising flour.

Baking powders are mixtures of sodium bicarbonate and a leavening acid, which may be one of eight compounds or mixtures thereof (E. J. Pyler, "Baking Science and Technology", 3rd Ed., Sosland Publishing, Merriam, Kans., 1988, pp. 928–931). Sodium bicarbonate dissolves readily in a batter or dough at room temperature, but the various leavening acids dissolve at different rates during mixing, make-up and cooking of the batter or dough. Fast-acting baking powders release practically all their carbon dioxide during the mixing step, whereas slow-acting baking powders act during the cooking step. Double-acting baking powders release some of their carbon dioxide during mixing, and the remainder during baking, frying or griddling.

Acidic sodium aluminum phosphate (SALP) and sodium aluminum sulfate (SAS) are chemical leavening acids that dissolve poorly in doughs or batters at room temperature, but are soluble at cooking temperatures. These slow-acting leavening acids often constitute approximately one-fourth the weight of a double-acting chemical leavening agent, i.e., baking powder. The only other commonly used slow-acting leavening acid is sodium acid pyrophosphate (SAPP).

Baking powders are used usually between 1% and 7% based on flour, which is equivalent to approximately 0.03–0.20 wt% aluminum ion based on flour (W. J. Sultan, "Practical Baking", 2nd Ed., AVI, Westport, Conn., 1959, p. 46) when the baking powder is double-acting and contains SALP or SAS.

There is accordingly a real and unsatisfied need in the art for an improved method to treat wheat-derived products so as to market brighter products with reduced brown or grey off-color. Additionally, there is a need for improved gluten processing techniques which avoid the use of volatile acids or bases.

SUMMARY OF THE INVENTION

The present invention overcomes the problems outlined above and provides essentially chlorophyll-free products comprising a wheat-derived component mixed with a source of $Zn^{+2}$ and/or $Al^{+3}$ ion. When $Zn^{+2}$ and $Al^{+3}$ are used individually, the $Zn^{+2}$ is present at a level of at least 0.020% by weight based upon the weight of the wheat-derived component taken as 100% by weight, and more preferably from about 0.04–0.5% by weight on this basis. When $Al^{+3}$ is used individually, the ion is present at a level of at least about 0.015% by weight based upon the weight of the wheat-derived component taken as 100% by weight, and more preferably from about 0.025–0.5% by weight on this basis. When a combination of $Zn^{+2}$ and $Al^{+3}$ ion are employed, the total content of such ions should normally be at least about 0.02% by weight, and more preferably from about 0.04–0.5% by weight on the above basis. The products of the invention may include noodles, pastas (all such products being collectively referred to herein as "pastas"), and doughs as well as ingredient products such as vital wheat gluten. Thus, the wheat-derived component may be selected from the group consisting of milled products from common and durum wheats, including flour, farina or semolina and gluten.

The most preferred source of $Zn^{+2}$ ion is zinc chloride, although other zinc compounds such as zinc sulfate, zinc acetate and zinc bromide may be used in particular situations. The most preferred source of $Al^{+3}$ ion is aluminum sulfate, although other compounds such as aluminum chloride and aluminum lactate are also useful. SAS and SALP may also be used, along with the other $Al^{+3}$ ion sources, in non-chemically leavened wheat-based products.

The effect of $Zn^{+2}$ or $Al^{+3}$ ion is particularly striking in the case of dried vital wheat gluten. To produce improved dried vital wheat gluten, zinc and/or aluminum ion can be added before or after gluten isolation. When zinc and/or aluminum ion is/are mixed with flour and water into a dough, the wheat gluten is isolated by conventional procedures such as the well-known Martin dough washing procedure (J. W. Knight and R. M. Olson, Wheat starch: production, modifications and uses, In: "Starch: Chemistry and Technology", R. L. Whistler, J. N. BeMiller and E. F. Paschall, p. 491). With effective zinc and/or aluminum additives, the gluten mass tends to have a somewhat reduced structural integrity, and in that form can be mixed with textured vegetable proteins to make a meat analog product (see e.g., U.S. Pat. Nos. 3,290,152 and 4,238,515). However, such reduction in structural integrity can be counteracted by the addition of a minor amount of calcium ion (generally up to about 0.2% by weight, based upon the weight of the water taken as 100%) into the wash water. The recovered gluten may then be drained, dried and ground to yield a free-flowing vital wheat gluten. It has been determined that $Zn^{+2}$ and/or $Al^{+3}$-supplemented glutens have a materially brighter color. Generally speaking, the improved dried glutens have an L*-value brightness (as herein defined) of at least about 87, and more preferably at least about 88.

Dried gluten may also be treated with zinc and/or aluminum ion solutions to achieve beneficial effects. A sample of commercial gluten with L*-value 83.0 was mixed in twice its weight of water containing 0.5% zinc chloride or 0.64% aluminum sulfate based on dry gluten weight. After washing either with water or 0.1% aqueous calcium chloride solution, the dried gluten products had L*-values of 90.0 compared to 87.4 for the blank sample.

It has also been found that the presence of $Zn^{+2}$ and/or $Al^{+3}$ ion allows preparation of aqueous dispersions of wheat gluten without the need for acids or bases. Such dispersions or emulsions can be prepared from a $Zn^{+2}$ and/or $Al^{+3}$-supplemented flour/water dough or from a $Zn^{+2}$ and/or $Al^{+3}$ supplemented wet-gluten mass. When water is used to isolate the gluten from the ion-supplemented dough or to wash the ion-supplemented gluten, the gluten can then be suspended in water by blending, without the need for acid or base. Generally, dispersions of 10–15% by weight gluten in water can be formed with a freshly mixed dough containing from about 0.05–0.3% by weight $Zn^{+2}$ ion or 0.020–0.20% by weight $Al^{+3}$ ion (based upon the weight of wheat flour taken as 100%) in the water; more preferably the $Zn^{+2}$ ion level is from about 0.05 to 0.07% by weight on this same basis, while the preferred $Al^{+3}$ level is from about 0.025–0.10% by weight on this basis. The resultant formed vital wheat gluten dispersion should contain at least about 0.10% by weight of $Zn^{+2}$ ion based upon the weight of the gluten taken as 100%; when $Al^{+3}$ is used, the amount of $Al^{+3}$ ion present in the resultant gluten dispersion should be at least about 0.03% by weight on this basis. When zinc chloride is added to commercial gluten, the resultant dispersions will include 10–15% gluten and initially from about 0.2–1.0% by weight zinc chloride, and most preferably from 0.4–0.6% by weight, based on dry gluten weight. In the case of aluminum sulfate added to commercial gluten, the initial levels are from about 0.3–2.0% by weight of the aluminum sulfate and most preferably from about 0.6–1% by weight, both based upon the dry weight of the gluten taken as 100% by weight.

When a zinc and/or aluminum ion-containing dispersion of gluten is neutralized to pH 7, approximately 80% of the gluten precipitates into a glutenin-enriched fraction, whereas the remaining 20% stays suspended. Drying the suspension yields a snow-white gliadin fraction.

Finally, it has been discovered that the final properties of gluten can be materially altered by selecting the appropriate processing technique and using a zinc and/or aluminum ion source. Thus, an elastic non-sticky gluten may be selectively produced, or alternately an extensible and sticky gluten can be provided. In each case, the original dough contains zinc chloride and/or aluminum sulfate and downstream processing determines the character of the final gluten. The properties of commercial dry gluten can also be changed by mixing gluten with an excess of water containing a zinc and/or aluminum ion source, followed by appropriate processing.

Figure 1:
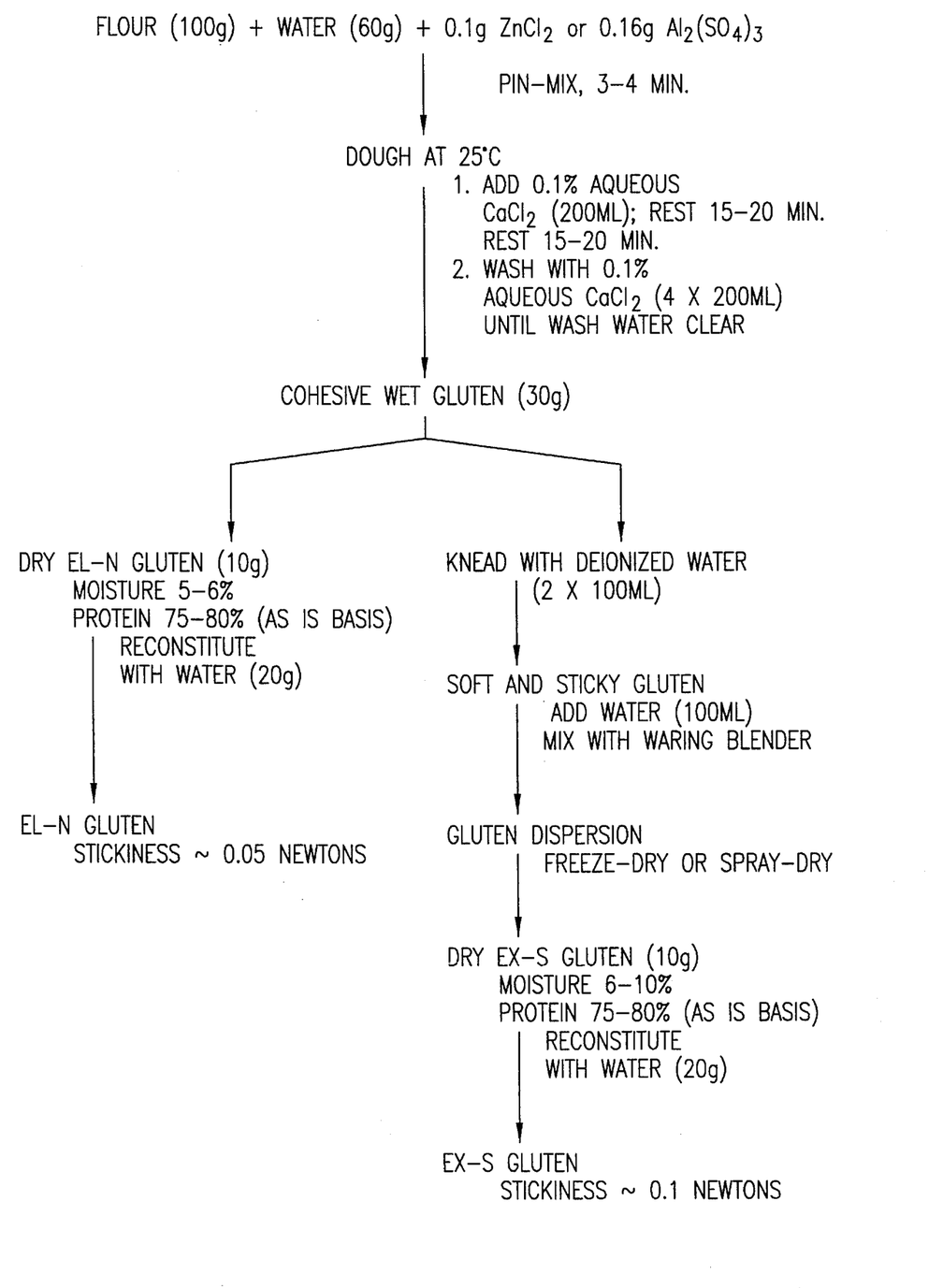
The single FIGURE shows a flow chart describing the preparation of elastic non-sticky (EL-N) gluten and an extensible sticky (Ex-S) gluten by the dough washing procedure (Martin's Process).

The single FIGURE describes preferred techniques employed in obtaining either an elastic non-sticky (El-N) or an extensible sticky (Ex-S) gluten product.

DETAILED DESCRIPTION OF THE PREFERRED EMBODIMENTS

The following examples set forth preferred processing techniques and products in accordance with the invention. It is to be understood that these examples are provided by way of illustration only, and nothing therein should be taken as a limitation upon the overall scope of the invention.

EXAMPLE 1

In all experiments, unless otherwise stated, the level of a test salt is reported in baker's weight percentage, which is to say, the level is based on 100 parts of the wheat ingredient at 14% moisture. Moreover, the weight of salt is always given in anhydrous form, although some were added in hydrated form.

In the following test 100 grams of wheat flour was provided which was previously milled to about 72% extraction from hard red winter wheat (HRW) and contained 10.6% protein and 0.47% ash on a 14% m.b. This wheat flour was mixed slowly in a 4-quart Hobart mixer fitted with a cake paddle, while a solution was added containing water (34 mL), table salt (2 g) and a second salt, i.e., zinc chloride (100 mg), zinc sulfate (100 mg), zinc acetate (100 mg), aluminum sulfate (320 mg), aluminum chloride (240 mg), calcium chloride (100 mg) and aluminum lactate (540 mg). Two of the second salts, sodium aluminum phosphate, acidic (SALP) (590 mg) and sodium aluminum sulfate (SAS) (450 mg) were added in powdered form to flour and blended prior to adding the solution of table salt (2 g) in water (34 mL). A blank noodle dough was also prepared which contained the identical ingredients set forth above, but without a second salt. The ingredients for each batch were mixed 1 minute at speed 1 and 4 minutes at speed 2 on the Hobart mixer. After blending each ingredient batch, the crumbly dough was pressed into a 5.5 mm thick sheet on an Ohtake Noodle Machine (Ohtake Mfg. Company, Tokyo, Japan). The resultant thick dough piece was sealed inside a polyethylene bag and rested 20 minutes. Thereupon, the thickness of the noodle dough sheet was reduced to 1.5 mm in five steps. Individual dough sheets (200×200 mm) were cut from the resultant sheets, sealed in polyethylene bags (250× 300 mm) and the bags stored at 25° C.

The color of a noodle dough sheet from each ingredient batch was followed for 24 hours using a Minolta Chroma Meter CR-210 (Minolta Corporation, Ramsey, N.J.). Six replicate readings (L*-values) were taken for each dough sheet at 0, 2, 4 and 24 hours, and the means of these six replications were reported.

As used herein, "L*-value brightness" or "L*-value" refers to a brightness test carried out as follows. The product being tested is placed on a horizontal surface, and the hand-held Minolta instrument is placed in contact with the product's surface. A separate area of the product (each ~5 cm in diameter in the case of noodle doughs) is used for each measurement. The instrument is calibrated with a tile having a known L*-value of 98.7. L*-values measured by the instrument ranged from 0 (black) to 100 (white).

Generally, L*-values differing by ±0.5 units are statistically different with a probability of error of 5%. Visual differences in brightness are generally ascertained when L*-values differ by ~0.5 units.

The results of this L*-value test for the raw noodle doughs of this Example are set forth in Table 1 below. Among the zinc salts (second salt), which were all tested at 0.1% by weight, zinc chloride was more effective than zinc sulfate in preserving brightness, whereas zinc acetate was ineffective. Among the aluminum salts (second salt), which were all tested at a level of 0.05% by weight aluminum ion, aluminum sulfate and aluminum chloride were more effective than aluminum lactate, SALP and SAS. Calcium chloride at a usage level of 0.1% by weight was ineffective in raw noodle dough.

TABLE 1

| Storage Time (h) | Blank | Second Salt Additive[3] | | | | | | | | |
|---|---|---|---|---|---|---|---|---|---|---|
| | | $CaCl_2$ (0.1%) | $ZnCl_2$ (0.1%) | $ZnSO_4$ (0.1%) | $Zn(OAc)_2$ (0.1%) | $Al_2(SO_4)_3$ (0.32%) | $AlCl_3$ (0.24%) | $Al(Lac)_3$ (0.54%) | SALP (0.59%) | SAS (0.45%) |
| 0 | 80.5[1] | 80.4 | 82.8 | 81.4 | 80.0 | 84.1 | 83.5 | 82.0 | 81.0 | 81.0 |
| 2 | 76.1 | 76.5 | 79.4 | 78.0 | 75.9 | 80.0 | 79.9 | 78.0 | 77.3 | 77.4 |
| 4 | 74.9 | 75.3 | 78.6 | 76.9 | 74.9 | 79.0 | 78.9 | 76.9 | 76.0 | 76.6 |
| 24[2] | 70.5 | 71.4 | 75.0 | 72.4 | 70.4 | 75.8 | 75.6 | 73.5 | 73.0 | 73.7 |

[1] Means of six replicate L*-value readings, where a higher L*-value indicates a brighter product.
[2] All L*-values at 24 h, except for $Zn(OAc)_2$ and $CaCl_2$, are statistically significantly different than the blank L*-value at $p = 0.05$.
[3] Abbreviations; Ac = acetyl, Lac = lactoyl, SALP = sodium aluminum phosphate, acidic, and SAS = sodium aluminum sulfate.

EXAMPLE 2

In this example, raw salt-noodle dough sheets were prepared as described in Example 1, using $CaCl_2$, $ZnCl_2$, $ZnSO_4$ and $Zn(OAc)_2$. In this case, however, the packaged raw noodle dough sheets were stored at 5° C. instead of the 25° C. storage of Example 1, and L*-value readings were taken over a 7 day period. The results are set forth in Table 2 and again demonstrate that 0.1 wt % level zinc chloride was the most effective zinc salt in maintaining brightness. Calcium chloride was only slightly active.

TABLE 2

| Storage Time (d) | Blank | Second Salt Additive | | | |
|---|---|---|---|---|---|
| | | $CaCl_2$ (0.1%) | $ZnCl_2$ (0.1%) | $ZnSO_4$ (0.1%) | $Zn(OAc)_2$ (0.1%) |
| 0 | 80.5[1] | 79.8 | 82.2 | 81.1 | 79.9 |
| 1 | 75.9 | 76.1 | 79.5 | 78.0 | 75.5 |
| 3 | 72.7 | 73.2 | 77.9 | 75.7 | 73.4 |
| 5 | 70.0 | 70.8 | 76.7 | 74.5 | 72.1 |
| 7[2] | 67.2 | 68.4 | 75.4 | 72.5 | 70.7 |

[1] Means of six replicate L*-value readings, where a higher L*-value indicates a brighter product.
[2] All L*-values at 7 d are statistically significantly different than the blank L*-value at $p = 0.05$.

EXAMPLE 3

In this example, one calcium, three zinc and five aluminum salts were tested to determine whether they maintained brightness of alkaline noodle doughs stored in raw form in polyethylene bags at 25° C. In each test, one hundred grams of the wheat flour described in Example 1 was blended in a 4-quart Hobart mixer while a solution of sodium and potassium carbonates (0.9 and 0.1 g, respectively in 20 ml water) was added over a period of 20 seconds mixing at speed 1. Immediately thereafter, a second salt solution containing 14 mL of water and a second salt, i.e., zinc chloride (100 mg), zinc sulfate (100 mg), zinc acetate (100 mg), calcium chloride (100 mg) aluminum sulfate (320 mg), aluminum chloride (240 mg) and aluminum lactate (540 mg) was added over a period of 20 seconds during continued mixing at speed 1. Two of the second salts, SALP (590 mg) and SAS (450 mg) were added in powder form to flour and blended prior to adding either of the salt solutions. An additional 20 seconds of speed 1 mixing then followed. At this point, mixing was continued for an additional 4 minutes at speed 2. A blank was also prepared in the same fashion. The alkaline noodle doughs with pH about 10.5 were formed and sheeted, and 200×200 mm samples of each raw dough sheet was stored in a sealed polyethylene bag at 25° C. The brightness of the respective products was tested over a 24 hour period, and the results are given in Table 3. The results show that in alkaline dough at the 0.1 wt % level, zinc acetate and zinc chloride are almost equally effective, whereas zinc sulfate is somewhat less effective. Calcium chloride (0.1% by weight) was ineffective. In alkaline doughs containing 0.24–0.59% by weight aluminum salt (all yielding 0.05% by weight aluminum ion), the sulfate and chloride salts were more effective than the lactate and the double salts of aluminum.

EXAMPLE 4

Raw alkaline noodle sheets were prepared as described in Example 3 and stored at 5° C.; product brightness was monitored over a 7 day period and the results noted in Example 3 were found in this test as well (Table 4).

TABLE 4

| Storage Time (d) | Second Salt Additive | | | | |
|---|---|---|---|---|---|
| | Blank | $CaCl_2$ (0.1%) | $ZnCl_2$ (0.1%) | $ZnSO_4$ (0.1%) | $Zn(OAc)_2$ (0.1%) |
| 0 | 79.8[1] | 79.6 | 80.9 | 80.7 | 81.2 |
| 1 | 71.7 | 71.3 | 76.7 | 73.9 | 76.3 |
| 3 | 69.1 | 68.2 | 74.6 | 71.0 | 73.0 |
| 5 | 67.8 | 67.0 | 73.4 | 69.6 | 72.2 |
| 7[2] | 66.5 | 65.6 | 72.5 | 68.7 | 71.8 |

[1]Means of six replicate L*-value readings, where a higher L*-value indicates a brighter product.
[2]All L*-values at 7 d are statistically significantly different than the blank L*-value at $p = 0.05$.

EXAMPLE 5

Adding zinc chloride to dough reduces dough pH. The following experiment was done to determine if reducing dough pH in the absence of zinc was effective in preserving brightness.

Five raw salt-noodle dough sheets were prepared from HRW wheat flour (100 g each) as described in Example 1. The other ingredients besides flour were as follows: Blank, water (34 mL); zinc chloride (100 mg) plus water (34 mL); zinc sulfate (210 mg) plus water (34 mL); 0.02 M hydrochloric acid (34 mL); and 0.01M sulfuric acid (34 mL). The pH of noodle doughs was measured by placing noodle dough on a special surface pH electrode (Sentron Model 1001, Federal Way, Wash.) as described by R. A. Miller, E. Graf, and R. C. Hoseney, *J. Food Sci* 59:1086 (1994). Noodle dough sheets were then sealed in polyethylene bags and stored at 25° C. Color measurements were made on duplicate samples at regular intervals using the Minolta Chroma Meter CR-210. The results (Table 5) show that adding 0.1% zinc chloride or 0.2% zinc sulfate, which increased dough acidity to pH 5.1–5.2 were more effective than mineral acids added to increase dough acidity to pH 5.2.

TABLE 3

| Storage Time (h) | Second Salt Additive[3] | | | | | | | | |
|---|---|---|---|---|---|---|---|---|---|
| | Blank | $CaCl_2$ (0.1%) | $ZnCl_2$ (0.1%) | $ZnSO_4$ (0.1%) | $Zn(OAc)_2$ (0.1%) | $Al_2(SO_4)_3$ (0.32%) | $AlCl_3$ (0.24%) | $Al(Lac)_3$ (0.54%) | SALP (0.59%) | SAS (0.45%) |
| 0 | 80.2[1] | 80.0 | 81.6 | 81.1 | 81.5 | 81.1 | 81.2 | 80.6 | 79.7 | 80.9 |
| 2 | 74.3 | 74.3 | 77.5 | 75.4 | 76.8 | 76.5 | 76.8 | 76.3 | 75.0 | 76.0 |
| 4 | 72.6 | 72.4 | 76.3 | 74.0 | 75.6 | 75.1 | 75.1 | 74.4 | 73.5 | 74.5 |
| 24[2] | 67.6 | 67.4 | 72.2 | 68.9 | 71.5 | 69.3 | 69.6 | 68.8 | 66.5 | 68.9 |

[1]Means of six replicate L*-value readings, where a higher L*-value indicates a brighter product.
[2]All L*-values at 24 h, except for $CaCl_2$ and SALP, are statistically significantly different than the blank L*-value at $p = 0.05$.
[3]Abbreviations; Ac = acetyl, Lac = lactoyl, SALP = sodium aluminum phosphate, acidic, and SAS = sodium aluminum sulfate.

TABLE 5

| | Acidifying Agent | | | | |
|---|---|---|---|---|---|
| | Blank | HCl | $H_2SO_4$ | $ZnCl_2$ | $ZnSO_4$ |
| | Dough pH | | | | |
| | 6.0 | 5.2 | 5.1 | 5.2 | 5.2 |
| Storage Time (h) | L*-values | | | | |
| 0 | 82.0[1] | 81.8 | 82.4 | 84.0 | 84.1 |
| 4 | 75.7 | 76.2 | 76.6 | 79.7 | 79.7 |
| 24[2] | 70.6 | 71.3 | 72.4 | 76.1 | 76.2 |

[1]Means of six replicate L*-value readings, where a higher L*-value indicates a brighter product.
[2]All L*-values at 24 h are statistically significantly different than the blank L*-value at $p = 0.05$.

EXAMPLE 6

In this example, tests were conducted to determine whether zinc chloride imparted flavor or textural changes in cooked salt or alkaline noodles. Salt and alkaline noodles were prepared as described in previous examples from dough sheets (1.1 mm thick) containing 0.1 wt %, 1000 ppm) zinc chloride. An otherwise identical blank containing no zinc chloride was also prepared. The freshly prepared noodles (1.5 mm wide and weighing 20 g) were cooked in 500 ml of boiling distilled water until the disappearance of the noodle core. The noodles were then drained, rinsed with water and subjected to textural and sensory measurements. Zinc analysis (Table 6) of the salt noodles before and after cooking showed a 50% loss of zinc chloride in the cooking water and that the cooked noodles contained approximately 500 ppm zinc chloride on a dry solids basis. One serving size (100 g, dry weight) of cooked noodles would provide 300% of daily value of zinc for an adult.

Table 7 shows that adding 1000 ppm (flour weight basis) zinc chloride to salt noodles increased cooking time 8% and cooking loss 19%. Zinc chloride also increased the strength of the cooked noodles by about 10%. Zinc chloride had little effect on the cooking or textural properties of alkaline noodles. Sensory analyses by triangular taste tests with ten untrained panelists demonstrated that 500 ppm zinc chloride in the salt noodles could be detected by taste. However, all the panelists agreed that the difference in flavor was not objectionable.

TABLE 6

| Noodle Product | Zinc Content of Cooked Salt Noodle Product (ppm) | % Zinc Retained in Cooked Salt Noodle Product |
|---|---|---|
| Blank | <20 | — |
| ZnCl$_2$-Supplemented Noodles (1000 ppm) | | |
| Optimally Cooked | 496 | 60 |
| Overcooked | 492 | 50 |

TABLE 7

| Product Tested | Cooking Time (min.) | Cooking Loss (5) | Breaking Force (N) | Elongation (%) |
|---|---|---|---|---|
| Salt Noodle (Blank) | 4.0 | 4.8 (a) | 0.42 (a) | 143 (a) |
| Salt Noodle + 0.1%ZnCl$_2$ | 4.3 | 5.7 (b) | 0.46 (b) | 144 (a) |
| Alkaline Noodle (Blank) | 7.0 | 8.6 (c) | 0.54 (c) | 127 (b) |
| Alkaline Noodle + 0.1%ZnCl$_2$ | 7.5 | 8.8 (c) | 0.54 (c) | 129 (b) |

In the above table, numbers with different letters in the same column are significantly different at p=0.05.

EXAMPLE 7

In this example, zinc chloride was tested to determine whether it would improve the color of spaghetti.

Durum semolina (770 g, db, 13% protein) was placed in a Hobart mixer fitted with a flat paddle agitator. Optimum water (33 g) with or without 0.1% zinc chloride (based on the weight of semolina taken as 100%) was added over a 2 minute period to the semolina while the mixer was running at speed 1. Thereafter, the mixer was run another 3 minutes at speed 2. The mixing bowl was covered with a damp cloth, and the crumbly dough was allowed to rest at room temperature for 15 minutes. Spaghetti was made using a small pasta press (Demaco model S-25, DeFrancisci Machine Co., Brooklyn, N.Y.) fitted with a spaghetti die with 84 circular, Teflon lined holes, 1.8 mm diameter (D. Maldari & Sons Inc., Brooklyn, N.Y.). The dough was transferred to the holding chamber of the press, and the chamber was evacuated to a vacuum gauge reading of 17 in. (446 mm) of mercury. The barrel of the extruder was maintained at 35° C. and the auger of press was set at 30 rpm. Extruded strands were cut into lengths of 50–60 cm and hung on aluminum poles. The loaded poles were placed in a laboratory dryer (Standard Industries Inc., Fargo, N.Dak.) controlled by Micristar Microprocessor (Research Inc., Minneapolis, Minn.). The product was dried at low temperatures as follows: 15 inutes at 30° C. and 90% relative humidity (RH); 4 hours each at 45° C. and 85, 80 and 75% RH; and finally, 15 minutes at 30° C. and 75% RH. The color of raw and dried spaghetti strands (about 20 laid side by side) were measured using the Minolta Chroma Meter CR-210 on duplicate samples. The results in Table 8 demonstrate that addition of zinc chloride improved the color of both raw and dried spaghetti.

TABLE 8

| Storage Time (h) | L*-values | | |
|---|---|---|---|
| | Blank | Treated[1] | ΔL |
| Raw Spaghetti Stored at 25° C. | | | |
| 0 | 68.0 | 71.9 | +3.9 |
| 2 | 67.5 | 69.7 | +2.2 |
| 4 | 66.6 | 69.2 | +2.6 |
| 24[2] | 64.9(a) | 67.7(b) | +2.8 |
| Dried Spaghetti | | | |
| After Drying[2] | 60.4(a) | 64.6(b) | +4.2 |

[1]Treated sample contained 0.1 wt % zinc chloride (based on semolina) in the formula.
[2]Values in a row with different letters are significantly different at p = 0.05.

EXAMPLE 8

Pie crusts were prepared from a commercial pastry flour containing 8.7% protein. Pastry flour (100 g, 14% m. b.) and 60 g shortening were mixed 30 seconds at speed 1 in a Hobart mixer fitted with a pie dough paddle agitator. The bowl was scraped down, and the contents mixed another 30 seconds at speed 2. A brine solution, 3 g sodium chloride dissolved in 26 g of chilled water with and without 0.1 g zinc chloride, was added to the flour-shortening shortening mix while mixing at speed 1 over a period of 15 seconds. The dough was mixed an additional 10–15 seconds, then covered with a damp cloth and allowed to rest for 1 h at 5° C. The dough was sheeted to about 3 mm thickness and pressed into disposable aluminum pans. The filled pans were sealed inside polyethylene bags, and the bags stored at 5° C. The color was measured on duplicate samples using the Minolta Chroma Meter CR-210. The results (Table 9) show that the zinc chloride treated pie crusts were brighter in color after storing 1–7 d at 5° C.

TABLE 9

| Time (d) | L*-values | |
|---|---|---|
| | Blank | Treated[1] |
| 0 | 76.5 | 76.5 |
| 1 | 75.4 | 76.1 |
| 3 | 74.8 | 75.7 |
| 5 | 74.2 | 75.4 |
| 7[2] | 73.9(a) | 75.3(b) |

[1] Treated sample contains 0.1% zinc chloride (based on flour) in the formula.
[2] Values in a row with different letters are significantly different at p = 0.05.

EXAMPLE 9

Biscuit doughs were prepared from a soft wheat flour containing 8.7% protein (14% m.b.). Flour (75 g, 14% m.b.), non-fat dry milk (2.3 g), table salt (1.4 g), and baking soda (1.5 g) were dry blended, and shortening (15 g) was cut into the dry ingredients. Water (42 mL) containing either zinc chloride (0.1% based on flour) or zinc sulfate (0.21% based on flour) was added, and the mixture kneaded into a dough. A blank biscuit dough contained no zinc salt. Biscuit doughs were sheeted to 1.2 cm thickness using a rolling pin. The sheeted doughs were placed in disposable aluminum pans, sealed in polyethylene bags, and the bags stored at 5° C. The color of biscuit doughs were measured using the Minolta Chroma Meter CR-210. The experiment was replicated twice. The results (Table 10) showed that zinc salts maintained brightness in stored (5° C.) biscuit dough.

TABLE 10

| Storage Time (h) | Blank | $ZnCl_2$[1] | $ZnSO_4$[1] |
|---|---|---|---|
| 0.00 | 79.0 | 79.4 | 79.1 |
| 24[2] | 75.9 | 77.7 | 77.1 |

[1] Amounts of $ZnCl_2$ and $ZnSO_4$ used were 0.1% and 0.21% (based on flour), respectively.
[2] All L*-values at 24 h are statistically significantly different than blank L*-value at p = 0.05.

EXAMPLE 10

In this example, vital wheat gluten was tested to determine if zinc salts would lighten the color thereof. Wheat gluten was isolated by conventional dough washing (Martin procedure) except for one experiment where Fellers modification of the Fesca procedure was used. The Martin process is illustrated in K. F. Finney, *Cereal Chem* 20:381 (1943).

Flour (100 g, 14% m.b.) and water (60 mL) containing 100 mg of a test salt were mixed to an optimum dough in a pin mixer. The various salts tested (at 0.1% fwb) included calcium chloride, zinc chloride, zinc sulfate, zinc acetate, zinc bromide, manganese chloride, and magnesium chloride. The dough kneading stage was repeated 6–7 times with water (200 mL) added each time. The dough was massaged by hand under the water, and the starch milk separated by screening through a No. 32 wire mesh. When the dough was mixed with zinc chloride, the first four wash waters contained 0.1% aqueous calcium chloride to counteract the slackening effect of zinc chloride on the dough. The final 2–3 washings were done with pure water to remove the bulk of the calcium ions, and the extensible and sticky gluten ball was drained and freeze-dried (Flexi-Dry Freeze-dryer, FTS Systems, Inc., Stone Ridge, N.Y.). The freeze-dried gluten was ground through a 0.5 mm opening wire mesh on a Tecator Cyclotech sample mill (Tecator Corporation, Sweden) and its color was measured using the Minolta Chroma Meter. The powdered gluten was carefully packed into the sample holder using a spatula, and three measurements were made by rotating the holder 120°. The data in Table 11, which is the mean of at least duplicate samples (6 readings), demonstrates that only zinc chloride among the seven salts tested improved gluten brightness. The zinc and calcium ions retained in gluten were about 10–15% of that added (Table 12). The commercial gluten included in Table 11 was the darkest sample because it had not been treated with zinc chloride and had been dried at a higher temperature rather than freeze-drying.

TABLE 11

| Gluten Additive | L*-value | ΔL |
|---|---|---|
| Blank — No Additive | 86.5 | — |
| $CaCl_2$ | 86.3 | −0.2 |
| $ZnCl_2$ | 89.0 | +2.5 |
| $ZnSO_4$ | 86.2 | −0.3 |
| $Zn(OAc)_2$ | 85.6 | −0.9 |
| $ZnBr_2$ | 84.8 | −1.7 |
| $MgCl_2$ | 86.0 | −0.5 |
| $MnCl_2$ | 82.0 | −4.5 |
| Commercial | 80.7 | −5.8 |

TABLE 12

| Treatment | Calcium in Gluten (wt %, d.b.) | Zinc in Gluten (wt %, d.b.) | Calcium (% retained) | Zinc (% retained) |
|---|---|---|---|---|
| Blank | <0.03 | <0.03 | — | — |
| 0.1%$ZnCl_2$ (fwb) in dough (100 g flour) + 0.1%$CaCl_2$ in Wash Water (4 × 200 mL) + Pure Water (2 × 100 mL) | 0.13 | 0.11 | 12.5 | 8.7 |
| 0.2%$ZnCl_2$ (fwb) in dough (100 g flour) + 0.1%$CaCl_2$ in Wash Water (4 × 200 mL) + Pure Water (2 × 100 mL) | 0.13 | 0.20 | 12.5 | 17.0 |

EXAMPLE 11

In this example, use of an alternate gluten extraction method in the presence of zinc chloride was demonstrated to produce a brighter gluten. The alternate method is the modified Fesca process described by Fellers et al., *Food Tech.* 23:260 (1969).

One hundred grams of water and 57.1 g of HRW wheat flour (water/flour=1.75 w/w) were mixed into a slurry at 25° C. The blank contained no zinc salt, whereas the test slurry contained 0.2% zinc chloride (based on flour). The slurry was sheared at high-speed using an Ultra Turrax Mixer (Tekmar Company, Cincinnati, Ohio) at a speed setting of 75 for 3 minutes, with only slight warming of the mixture, and the pH of each slurry was measured. The highly sheared slurry was centrifuged at 1500 rpm (500× g) for 5 minutes in a CU-5000 centrifuge (Damon/IEC Division, Dunstable, Beds, UK) to separate the slurry into prime starch (bottom layer), branny material and tailing starch (middle layer), and protein concentrate (top layer). The protein concentrate phase was poured off, and was centrifuged again at 3000 rpm (1000× g) for 10 minutes. Gluten became cohesive during this step, and the gluten mass was hand-washed until starch was no longer visible in the washings. In the test sample containing zinc chloride, the gluten mass was washed with 0.1 wt % aqueous calcium chloride to remove the starch. Prime starch was rinsed with distilled water twice to remove the branny material, and the washings were discarded. Starch, washed out from the protein concentrate, was recovered by centrifugation (500× g for 10 minutes), and was washed several times with fresh water. The combined prime starch and the starch from protein concentrate was dried in an oven at 45° C. for 24 hours, whereas gluten samples were freeze-dried. Color measurements were made on the gluten using the Minolta Chroma Meter. The results demonstrate that gluten isolated by this procedure in the presence of zinc chloride was again brighter than without zinc chloride. The gluten color (L*-value) for the zinc chloride-fractionation gluten was 89.1, whereas the blank had an L*-value of 87.2.

Fractionation in the presence of zinc chloride was not detrimental to the process, and even appeared to give a slightly thinner flour slurry. In the presence of zinc chloride 29 g starch was obtained, as compared to 30 g starch yield for the blank.

EXAMPLE 12

Gluten was isolated from HRW wheat flour in the presence of zinc chloride additive at different concentrations (0–1.0%, fwb) according to Example 10, where aqueous calcium chloride is used to wash the starch away from the dough (gluten) ball followed by 2–3 final washings with pure water. After the gluten was freeze-dried, its brightness (L*-value) was measured using the Minolta Chroma Meter CR-210. Table 13 demonstrates that the addition of zinc chloride above about 0.1% by weight based upon the weight of the flour taken as 100% gave no further improvement in the brightness of gluten; however, use of such minor amounts of zinc chloride did increase gluten brightness.

TABLE 13

| Level of $ZnCl_2$ Additive (% fwb) | L*-value | ΔL |
|---|---|---|
| 0 | 86.5 | — |
| 0.1 | 89.1 | +2.6 |
| 0.2 | 89.0 | +2.5 |
| 0.5 | 89.0 | +2.5 |
| 1.0 | 89.3 | +2.8 |

EXAMPLE 13

In this example, zinc chloride or aluminum sulfate was used to assist in the formation of a gluten emulsion or dispersion in distilled water. At the same time, the use of calcium chloride was demonstrated to overcome the slackening effect of zinc chloride or aluminum sulfate on wet gluten.

HRW wheat flour (100 g, 14% m.b.) was mixed into a dough with distilled water (60 mL) containing various ion levels of zinc chloride (0–0.1% by weight based on flour) or aluminum sulfate (0–0.16% by weight based on flour). The dough was placed in distilled water containing calcium chloride (0–0.1% by weight based on water) and allowed to rest for 15–20 minutes. The dough was hand-washed with distilled water (200 mL) containing different levels of calcium chloride (0–0.1% by weight based on water) and the starch was separated by pouring over a U.S. 32 wire mesh. The washings were repeated (3×200 mL) until most of the starch was washed out of the gluten followed with pure water (2×100 mL). The gluten was then suspended in 100 mL distilled water, blended in a Waring blender for about 15–30 seconds and observed for uniformity of emulsified gluten. The results in Table 14 indicate that it is necessary to have a minimum of 0.1 wt % zinc chloride or 0.16 wt % aluminum sulfate in the dough to obtain water-dispersible gluten. The results also show that a minimum of 0.1% calcium chloride must be in the wash water to obtain a cohesive dough ball during kneading of the dough mixed with 0.1 wt % zinc chloride or 0.16 wt % aluminum sulfate. Using 0.1 wt % calcium chloride in the wash water on dough containing 0.1 wt % zinc chloride or 0.16 wt % aluminum sulfate overcame the weakening effect of zinc chloride or aluminum sulfate on dough during gluten isolation. However, such gluten isolated using 0.1% aqueous calcium chloride will not emulsify when mixed with water, unless the wet gluten is washed with 2–3 times its weight of pure water.

TABLE 14

| | $CaCl_2$ in Wash Water (% by wt. based on water) | Cohesiveness of Dough | Water Dispersibility of Gluten |
|---|---|---|---|
| $ZnCl_2$ in Dough (% fwb) | | | |
| 0 | — | good | poor |
| 0.05 | — | good | poor |
| 0.08 | — | good | poor |
| 0.10 | — | very poor | good |
| 0.10 | 0.05 | poor | good |
| 0.10 | 0.08 | fair | fair |
| 0.10 | 0.10 | good | poor |
| $Al_2(SO_4)_3$ in Dough (% fwb) | | | |
| 0 | — | good | poor |
| 0.08 | — | good | poor |
| 0.12 | — | poor | fair |
| 0.16 | — | very poor | good |
| 0.16 | 0.05 | poor | good |
| 0.16 | 0.10 | good | poor |

EXAMPLE 14

In this example, the abilities of zinc and aluminum ion salts to affect gluten dispersions in distilled water were compared. Batches of HRW flour (100 g) were mixed into doughs with water (60 mL) containing 4 zinc salts (0.1–0.3 wt % based upon flour), or one of three aluminum salts (0.12–0.27 wt % based upon flour). A fourth aluminum salt, SAS (0.45 wt % based upon flour) was blended in powder form with the flour prior to adding water (60 mL) and mixing to a dough. Gluten was isolated from the doughs using 0.1% aqueous calcium chloride (4×200 mL) followed by water (2×100 mL) as described in Example 10. The isolated gluten was mixed vigorously in water in a Waring blender to determine its dispersibility. After blending, gluten samples were freeze-dried, ground, and the brightness of ground gluten determined by the Minolta Chroma Meter. The results (Table 15) indicate that a minimum of 0.05 wt % zinc ion or 0.025 wt % aluminum ion has the ability to form a gluten emulsion, while at the same time improving whiteness of the gluten. Wet gluten isolated in the presence of zinc or aluminum ion without calcium ion in the wash water had a soft, soapy feel, and a brighter color than a blank sample.

TABLE 15

| Dough Additive[1] (0.1% fwb) | Cohesiveness of Dough | Water Dispersibility of Gluten | L*-value | ΔL |
|---|---|---|---|---|
| Blank | good | poor | 86.4 | — |
| $ZnCl_2$(0.1%) | poor | good | 89.8 | +3.4 |
| $ZnSO_4$(0.21%) | poor | good | 89.7 | +3.3 |
| $ZnBr_2$(0.3%) | poor | good | 90.1 | +3.7 |
| $Zn(OAc)_2$(0.16%) | poor | good | 89.6 | +3.2 |
| $Al_2(SO_4)_3$(0.16%) | poor | good | 89.5 | +3.1 |
| $AlCl_3$(0.12%) | poor | good | 89.9 | +3.5 |
| $Al(Lac)_3$(0.27%) | poor | good | 89.9 | +3.5 |
| SAS(0.45%) | poor | good | 89.9 | +3.4 |

[1]Abbrevations; Ac = acetyl, Lac = lactoyl, SAS = sodium aluminum sulfate

EXAMPLE 15

The purpose of this experiment was to show that zinc salts improve the color of the gluten other than by lowering the pH of gluten.

Gluten was isolated from the HRW wheat flour as described in Example 10. Aqueous solutions (59 each mL) of the following salts or acids were prepared: blank-none, zinc chloride-100 mg; zinc sulfate-210 mg; zinc bromide-300 mg; zinc acetate-160 mg; 0.2 M hydrochloric acid, 5.9 mL; and 0.1M sulfuric acid, 5.9 mL. Each solution was added to flour (100 g, 14% m. b.), and the ingredients mixed to an elastic dough. The pH of dough was measured using a surface pH electrode (Sentron Model 1001, Federal Way, Wash.) by placing a small sample of dough on the electrode probe. Gluten was isolated from all doughs by washing with 0.1% aqueous calcium chloride solution followed by water. The pH of the wet gluten was measured on the surface pH electrode, and the wet gluten was suspended in distilled water (100 mL), and the suspension freeze dried. The freeze dried samples were ground, and the color of the gluten samples measured using the Minolta Chroma Meter CR-210. The experiment was replicated twice. The results (Table 16) indicate that gluten isolated from doughs containing zinc salts were brighter than gluten from doughs containing mineral acids.

TABLE 16

| Treatment | Dough pH | Gluten pH | L*-value[1] |
|---|---|---|---|
| Control | 6.0 | 5.9 | 86.5 (a) |
| HCl | 5.0 | 5.0 | 88.6 (b) |
| $H_2SO_4$ | 5.0 | 5.0 | 88.4 (b) |
| $ZnCl_2$(0.1%) | 5.2 | 5.2 | 89.8 (c) |
| $ZnSO_4$(0.21%) | 5.3 | 5.3 | 89.7 (c) |
| $ZnBr_2$(0.3%) | 5.2 | 5.2 | 90.1 (c) |
| $Zn(OAc)_2$(0.16%) | 5.5 | 5.5 | 89.6 (b) |

[1]Values in the same column with different letters are significantly different at p = 0.05.

EXAMPLE 16

Gluten was isolated from HRW wheat flour in the presence of zinc chloride (0.1% fwb) as described previously and was either freeze-dried or sprayed dried. Spray-drying was done in a laboratory Model 100 Fluid-Bed Granulator/Coater (Applied Chemical Technologies Inc., Florence, Ala.) with air inlet temperature of 93° C. and outlet temperature of 70° C. The brightness of the laboratory-prepared gluten samples were compared with commercial gluten samples procured from around the world. The results in Table 17 demonstrate that gluten isolated in the presence of zinc chloride was much brighter as compared to commercial gluten.

TABLE 17

| Gluten Sample | Source | Drying Method | L*-value | ΔL |
|---|---|---|---|---|
| With added $ZnCl_2$ | This Laboratory | freeze-dried | 89.0 | — |
| Blank (no added $ZnCl_2$) | This Laboratory | freeze-dried | 86.5 | −2.5 |
| With added $ZnCl_2$ | This Laboratory | spray-dried | 87.3 | −1.7 |
| Commercial 1 | Sweden | flash-dried | 80.7 | −8.3 |
| Commercial 2 | USA | flash-dried | 80.7 | −8.3 |
| Commercial 3 | Finland | flash-dried | 82.3 | −6.7 |
| Commercial 4 | Netherlands | flash-dried | 82.8 | −6.2 |
| Commercial 5 | USA | flash-dried | 83.0 | −6.0 |
| Commercial 6 | USA | flash-dried | 83.1 | −5.9 |
| Commercial 7 | Australia | flash-dried | 83.3 | −5.7 |
| Commercial 8 | Mexico | flash-dried | 84.1 | −4.9 |
| Commercial 9 | USA | spray-dried | 84.8 | −4.2 |
| Commercial 10 | France | flash-dried | 86.1 | −2.9 |

EXAMPLE 17

The purpose of this experiment was to demonstrate the ability of zinc chloride to disperse commercial gluten in distilled water, and to achieve a lightening effect upon drying without removal of any substance from the gluten.

Commercial gluten (10 g, db) was mixed in a small pin mixer with distilled water (20 mL) containing various levels (0-0.5% based on gluten) of zinc chloride. The wet gluten mass was allowed to rest for 15 minutes, and its pH was measured by placing a small piece of wet gluten on the surface pH probe. Gluten was then suspended in 50 mL distilled water, vigorously blended in a Waring blender for about 30 seconds and observed for the uniformity of dispersion. The samples were then freeze dried, ground and color measurements were taken on the Minolta Chroma Meter CR-210.

The stickiness or force required to overcome the adhesiveness of gluten was measured as follows. Gluten (1 g db) was hand-mixed into a homogeneous wet mass with 1.75 mL of distilled water. The wet gluten was allowed to rest for about 5 min, and half the sample was carefully pressed into a sample holder with a 13 mm inside diameter well. Using a TA-XT2 Texture Analyzer (Texture Technologies Corp, Scarsdale, N.Y.), the wet gluten was compressed with a cylindrical probe (10 mm in diameter) at a speed of 1.0 mm/second and to a maximum force of 0.5 Newtons. The probe was immediately retracted and the maximum force required to overcome the adhesiveness of gluten to the probe surface was taken from the negative peak. The data was recorded using a Stable Micro Systems software, and the measurements were made on duplicate samples.

The results in Table 18 indicate that it is desirable to have a minimum of 0.5% zinc chloride (based on gluten at dry basis) to disperse commercial gluten, and that stickiness of gluten increased with increasing concentrations of zinc chloride up to 0.2 wt %, then remained constant.

TABLE 18

| ZnCl$_2$ Level (%) | Gluten pH | Force[1] Required to Overcome Stickiness of Gluten (N) | Water Dispersibility of Gluten | L*-value[1] after Freeze Drying |
|---|---|---|---|---|
| 0 | 5.9 | 0.05 (a) | Poor | 86.7 (a) |
| 0.1 | 5.6 | 0.05 (a) | Poor | 88.0 (b) |
| 0.2 | 5.4 | 0.12 (b) | Moderate | 88.6 (c) |
| 0.3 | 5.3 | 0.12 (b) | Fair | 89.7 (d) |
| 0.5 | 5.2 | 0.13 (b) | Good | 89.9 (d) |

[1]Values in the column with different letters are significantly different at p = 0.05.

EXAMPLE 18

The purpose of this experiment was to prepare extensible-sticky (Ex-S) and elastic non-sticky (El-N) gluten with improved color from commercial gluten.

Commercial gluten (10 g, db) plus distilled water (20 mL) containing zinc chloride (0.5% based on gluten) was mixed 3 minutes into a wet cohesive mass with a pin mixer. The wet mass was allowed to rest for 15 min, and was washed once with distilled water (100 mL) or with 0.1 wt % aqueous calcium chloride (100 mL). Washings were discarded. The gluten washed with water (Ex-S) disintegrated into many small pieces, and became dispersed when stirred in distilled water (50 mL) using a Waring blender. The gluten washed with calcium chloride solution remained cohesive and was broken by hand into small pieces (1 cm in diameter). The two samples were freeze dried, ground, and their brightness was measured using the Minolta Chroma Meter CR-210. The brightness (L*-values) for Ex-S and El-N glutens were 90.0 and 87.4 respectively, compared to commercial gluten with of 83.0. The yields of Ex-S and El-N glutens obtained were ~100%. The stickiness values for extensible-sticky (Ex-S) and elastic non-sticky (El-N) were 0.12 and 0.05 Newtons, respectively.

EXAMPLE 19

The quality of gluten isolated from HRW wheat flour in the presence and absence of zinc chloride was evaluated by gluten bake tests (Czuchajowska et al., *Cereal Foods World*, 35:458 (1990)), hydration capacity, and gluten index (Perten, *Milling (UK)* 182:38 (1989). Gluten bake tests were conducted using 5 g (db) of gluten instead of 10 g. The results shown in Table 19 demonstrate that the quality of gluten treated with zinc chloride is comparable with both the control and with commercial samples. The gluten balls baked from zinc chloride-treated gluten collapsed upon cooling, indicating the cell walls of baked gluten were not porous to air. This characteristic can be countered by the addition of calcium chloride or sodium chloride to the gluten or to the wash water when isolating gluten.

TABLE 19

| Gluten Sample | Hydration Capacity (g) | Gluten Index | Baked Gluten Volume (cc) |
|---|---|---|---|
| Commercial 3 | 2.42[1](a) | 29.8[1] (a) | 135[1] (a) |
| Commercial 4 | 2.24 (b) | 24.7 (b) | 128 (a) |
| Commercial 6 | 2.14 (c) | 87.7 (c) | 97 (b) |
| Commercial 7 | 2.00 (d) | 79.0 (de) | 137 (a) |
| Commercial 8 | 2.29 (b) | 74.3 (e) | 133 (a) |
| Commercial 10 | 2.25 (b) | 83.1 (d) | 88 (b) |
| This Lab, No ZnCl$_2$ | 2.24 (b) | 99.1 (f) | 120 (c) |

TABLE 19-continued

| Gluten Sample | Hydration Capacity (g) | Gluten Index | Baked Gluten Volume (cc) |
|---|---|---|---|
| This Lab with ZnCl$_2$ | 2.42(a) | 98.2(f) | 110 (c) |

[1]Values in a column with different letters are significantly different at p = 0.05.

EXAMPLE 20

In this example a baking test was carried out on three samples of gluten. One sample was gluten isolated from wheat flour using 0.1 wt % zinc chloride in the dough as described in Example 10. A second gluten sample (blank) was that isolated from the wheat flour with no zinc chloride present. A third sample was a commercial gluten.

A commercial pastry flour (8.65% protein) was blended with one each of the three gluten samples to increase its protein content from 8.65 to 11.65%. Bread was baked with the blank, zinc chloride-isolated and commercial gluten at optimum absorption and optimum mixing times. The straight-dough, pup-loaf baking procedure was used (Anonymous, *AACC Standard Method* 10–10B, American Association of Cereal Chemists, St. Paul, Minn.); all doughs contained flour (100 g, 14% m. b.), sucrose (6 g), non-fat dry milk (4 g), shortening (3 g), and instant dry yeast (2.0 g). Doughs were fermented 90 minutes, proofed 36 minutes at 30° C., and baked 24 minutes at 218° C. The volume of bread was measured immediately after baking and bread crumb was evaluated 1 hour after baking. The results are set forth in Table 20.

TABLE 20

| Dough | Water Absorption (%) | Mixing Time (min) | Loaf Volume (cc)[1] |
|---|---|---|---|
| Pastry flour (PF) + no gluten | 57.0 | 4.0 | 703 ± 3 (a) |
| PF + gluten (blank) | 61.0 | 4.0 | 862 ± 16 (b) |
| PF + ZnCl$_2$-gluten | 61.0 | 4.0 | 848 ± 8 (bc) |
| PF + ZnCl$_2$-gluten + 0.1% CaCl$_2$ | 61.0 | 4.0 | 865 ± 21 (b) |
| PF + commercial gluten | 61.0 | 4.0 | 835 ± 7 (c) |

[1]Values in column with the same letters are not significantly different at p = 0.05.

EXAMPLE 21

The purpose of this experiment was to isolate gluten from wheat flour in the presence of 0.05% by weight zinc ion (based on flour), and then to fractionate the wet gluten into gliadin and a glutenin-enriched gluten.

The wheat flour (100 g, 14% m.b.) was blended either with 0.02M hydrochloric acid (59 mL) or with a solution of zinc chloride (100 mg) in water (59 mL). Each blend was mixed to an elastic dough with pH ~5.2, and gluten was isolated by washing the dough with 0.1% aqueous calcium chloride followed by water as described in Example 10. The pH of wet gluten was measured by use of the surface pH electrode. Wet gluten was suspended in distilled water (100 mL) by blending in a Waring blender, and the suspension was adjusted to pH 6.0 by addition of 0.05M sodium hydroxide. At pH 6.0, a cohesive mass precipitated from the suspension. The supernatant was decanted from the precipitate, which was washed (5×50 mL) with distilled water until the washings were clear. The precipitate was freeze-dried, and the washings were combined with the decanted supernatant to give a milky white suspension that was freeze-dried. The experiment was replicated twice.

The zinc-containing test dough gave 1.7 g of freeze-dried material from its milky suspension at pH 6.0 and 8.3 g of freeze-dried precipitate. The material from the suspension was white (L=100) and had the properties of gliadin; it was 90% soluble in 70% aqueous ethanol and when mixed with a 0.5 part water gave a highly extensible dough mass. The freeze-dried precipitate, which was a glutenin-enriched gluten, had L=86.8.

The blank (i.e., zinc ion-free) dough, which contained hydrochloric acid, gave less gliadin fraction (0.8 g) and less (7.3 g) glutenin-enriched gluten of low brightness (L=84.0). During the dough washing steps, the gluten containing hydrochloric acid was not so cohesive and some was lost during screening of the washings.

We claim:

1. A product comprising an amount of a wheat-derived component mixed with a source of $Zn^{+2}$ ion, said source being present at a level to yield at least about 0.02% by weight $Zn^{+2}$ ion in the product, based upon the weight of said wheat-derived component taken as 100% by weight, said product being essentially free of chlorophyll.

2. The product of claim 1, said component being selected from the group consisting of wheat flour, farina, semolina flour and gluten.

3. The product of claim 1, said source being selected from the group consisting of zinc chloride, zinc sulfate, zinc acetate and zinc bromide.

4. The product of claim 3, said source being zinc chloride.

5. The product of claim 1, said level being sufficient to yield from about 0.04–0.5% by weight $Zn^{+2}$ ion.

6. The product of claim 1, said component being vital wheat gluten.

7. The product of claim 6, said product being an 10–15% aqueous dispersion of said vital wheat gluten.

8. The product of claim 7, including a minor amount of calcium chloride.

9. The product of claim 8, said calcium chloride being present at a level to provide up to about 0.2% by weight calcium ion, based upon the weight of said gluten taken as 100%.

10. The product of claim 6, said product being a dried vital wheat gluten product.

11. The product of claim 10, said product having an L*-value brightness of at least about 87.

12. The product of claim 1, said product being selected from the group consisting of pastas and raw doughs.

13. A method of preparing a product which is essentially free of chlorophyll and includes a wheat-derived component, said method including the step of mixing a source of $Zn^{+2}$ ion with said component, said source being present at a level to yield at least about 0.02% by weight $Zn^{+2}$ ion in the product, based upon the weight of said wheat-derived component taken as 100% by weight.

14. The method of claim 13, said component being selected from the group consisting of wheat flour, farina, semolina flour and gluten.

15. The method of claim 13, said source being selected from the group consisting of zinc chloride, zinc sulfate, zinc acetate and zinc bromide.

16. The method of claim 15, said source being zinc chloride.

17. The method of claim 13, said level being sufficient to yield from about 0.04–0.5% by weight $Zn^{+2}$ ion.

18. The method of claim 13, said component being vital wheat gluten.

19. The method of claim 18, said product being an aqueous dispersion of said vital wheat gluten.

20. The method of claim 19, including a minor amount of calcium chloride.

21. The method of claim 20, said calcium chloride being present at a level to provide up to about 0.2% by weight calcium ion, based upon the weight of said gluten taken as 100%.

22. The method of claim 18, said product being a dried vital wheat gluten product.

23. The method of claim 22, said product having an L*-value brightness of at least about 87.

24. The method of claim 13, said product being selected from the group consisting of pastas and raw doughs.

25. Dried vital wheat gluten having an L*-value brightness of at least about 87.

26. The dried vital wheat gluten of claim 25, said L*-value brightness being at least about 88.

27. An aqueous dispersion of gluten comprising from about 10 to 15% by weight wheat gluten in water, with from about 0.02–0.3% by weight $Zn^{+2}$ ion dispersed in said water, said weight of $Zn^{+2}$ ion being based upon the weight of said gluten taken as 100%.

28. A 10–15% aqueous dispersion of vital wheat gluten mixed with a minor amount of calcium chloride and a source of $Zn^{+2}$ ion, said source being present at a level to yield at least about 0.1% by weight $Zn^{+2}$ ion in the dispersion, based upon the weight of said vital wheat gluten taken as 100% by weight, said dispersion being essentially free of chlorophyll.

29. The dispersion of vital wheat gluten of claim 28, said calcium chloride being present at a level to provide up to about 0.2% by weight calcium ion, based upon the weight of said vital wheat gluten taken as 100%.

30. A product selected from the group consisting of pastas and raw doughs and comprising an amount of a wheat-derived component mixed with a source of $Zn^{+2}$ ion, said source being present at a level to yield at least about 0.02% by weight $Zn^{+2}$ ion in the product, based upon the weight of said wheat-derived component taken as 100% by weight, said product being essentially free of chlorophyll.

31. A method of preparing a vital wheat gluten product which is essentially free of chlorophyll and includes a minor amount of calcium chloride and vital wheat gluten, said method including the step of mixing a source of $Zn^{+2}$ ion with vital wheat gluten, said source being present at a level to yield at least about 0.1% by weight $Zn^{+2}$ ion in the vital wheat gluten, based upon the weight of said vital wheat gluten taken as 100% by weight.

32. The method of claim 31, including the steps of mixing said $Zn^{+2}$ ion source with wheat flour containing said vital wheat gluten, and thereafter separating the vital wheat gluten from the flour.

33. The method of claim 31, including the steps of mixing said $Zn^{+2}$ ion source with vital wheat gluten previously separated from wheat flour.

34. A product comprising an amount of a wheat-derived component mixed with a source of $Al^{+3}$ ion, said source being present at a level to yield at least about 0.015% by weight $Al^{+3}$ ion in the product, based upon the weight of said wheat-derived component taken as 100% by weight, said $Al^{+3}$ ion source being selected from the group consisting of aluminum sulfate, aluminum chloride, and aluminum lactate, said product being essentially free of chlorophyll.

35. The product of claim 34, said level being from about 0.025–0.5% by weight.

36. The product of claim 34, said component being selected from the group consisting of wheat flour, farina, semolina flour and gluten.

37. The product of claim 34, said component being vital wheat gluten.

38. The product of claim 37, said product being an 10–15% aqueous dispersion of said vital wheat gluten.

39. The product of claim 38, including a minor amount of calcium chloride.

40. The product of claim 39, said calcium chloride being present at a level to provide up to about 0.2% by weight calcium ion, based upon the weight of said gluten taken as 100%.

41. The product of claim 37, said product being a dried vital wheat gluten product.

42. The product of claim 41, said product having an L*-value brightness of at least about 87.

43. The product of claim 34, said product being selected from the group consisting of pastas and raw doughs.

44. A method of preparing a product which is essentially free of chlorophyll and includes a wheat-derived component, said method including the step of mixing a source of $Al^{+3}$ ion with said component, said source being present at a level to yield at least about 0.015% by weight $Al^{+3}$ ion in the product, based upon the weight of said wheat-derived component taken as 100% by weight, said $Al^{+3}$ ion source being selected from the group consisting of aluminum sulfate, aluminum chloride, and aluminum lactate.

45. The method of claim 44, said component being selected from the group consisting of wheat flour, farina, semolina flour and gluten.

46. The method of claim 44, said component being vital wheat gluten.

47. The method of claim 46, said product being an aqueous dispersion of said vital wheat gluten.

48. The method of claim 47, including a minor amount of calcium chloride.

49. The method of claim 48, said calcium chloride being present at a level to provide up to about 0.2% by weight calcium ion, based upon the weight of said gluten taken as 100%.

50. The method of claim 44, said product being a dried vital wheat gluten product.

51. The method of claim 50, said product having an L*-value brightness of at least about 87.

52. The method of claim 44, said product being selected from the group consisting of pastas and raw doughs.

53. The method of claim 44, said level being from about 0.025–0.5% by weight.

54. A product comprising an amount of a wheat-derived component mixed with a source of Zn +2 ion and a source of $Al^{+3}$ ion, the combined total amount of the $Zn^{+2}$ and $Al^{+3}$ ions provided by said sources being at least about 0.02% by weight, based upon the weight of said wheat-derived component taken as 100% by weight, said product being essentially free of chlorophyll.

55. The product of claim 54, said combined total amount being from about 0.04–0.5% by weight.

56. The product of claim 54, said component being selected from the group consisting of wheat flour, farina, semolina flour and gluten.

57. The product of claim 54, said $Zn^{+2}$ ion source being selected from the group consisting of zinc chloride, zinc sulfate, zinc acetate and zinc bromide.

58. The product of claim 57, said $Zn^{+2}$ ion source being zinc chloride.

59. The product of claim 54, said component being vital wheat gluten.

60. The product of claim 59, said product being an 10–15% aqueous dispersion of said vital wheat gluten.

61. The product of claim 60, including a minor amount of calcium chloride.

62. The product of claim 61, said calcium chloride being present at a level to provide up to about 0.2% by weight calcium ion, based upon the weight of said gluten taken as 100%.

63. The product of claim 54, said product being a dried vital wheat gluten product.

64. The product of claim 63, said product having an L*-value brightness of at least about 87.

65. The product of claim 54, said product being selected from the group consisting of pastas and raw doughs.

66. The product of claim 54, said $Al^{+3}$ ion source being selected from the group consisting of aluminum sulfate, aluminum chloride, aluminum lactate, acidic sodium aluminum phosphate and sodium aluminum sulfate.

67. A method of preparing a product which is essentially free of chlorophyll and includes a wheat-derived component, said method including the step of mixing a source of $Zn^{+2}$ ion and a source of $Al^{+3}$ ion with said component, the combined total amount of $Zn^{+2}$ and $Al^{+3}$ ion provided by said sources being at least about 0.02% by weight, based upon the weight of said wheat-derived component taken as 100% by weight.

68. The method of claim 67, said component being selected from the group consisting of wheat flour, farina, semolina flour and gluten.

69. The method of claim 67, said $Zn^{+2}$ ion source being selected from the group consisting of zinc chloride, zinc sulfate, zinc acetate and zinc bromide.

70. The method of claim 69, said $Zn^{+2}$ ion source being zinc chloride.

71. The method of claim 67, said combined total being from about 0.04–0.5% by weight.

72. The method of claim 67, said component being vital wheat gluten.

73. The method of claim 72, said product being an aqueous dispersion of said vital wheat gluten.

74. The method of claim 73, including a minor amount of calcium chloride.

75. The method of claim 74, said calcium chloride being present at a level to provide up to about 0.2% by weight calcium ion, based upon the weight of said gluten taken as 100%.

76. The method of claim 72, said product being a dried vital wheat gluten product.

77. The method of claim 76, said product having an L*-value brightness of at least about 87.

78. The method of claim 67, said product being selected from the group consisting of pastas and raw doughs.

79. The method of claim 67, said $Al^{+3}$ ion source being selected from the group consisting of aluminum sulfate, aluminum chloride and aluminum lactate, acidic sodium aluminum phosphate and sodium aluminum sulfate.

80. A non-chemically leavened, wheat-based product comprising a wheat-derived component mixed with a source of $Al^{+3}$ ion, said source being present at a level to yield at least about 0.015% by weight $Al^{+3}$ ion in the product, based upon the weight of said wheat-derived component taken as 100% by weight, said product being essentially free of chlorophyll.

81. The product of claim 80, said $Al^{+3}$ ion source being selected from the group consisting of aluminum sulfate, aluminum chloride and aluminum lactate, acidic sodium aluminum phosphate and sodium aluminum sulfate.

82. The product of claim 80, said product being selected from the group consisting of pastas and raw doughs.

83. A 10–15% aqueous dispersion of vital wheat gluten mixed with a minor amount of calcium chloride and a source of $Al^{+3}$ ion, said source being present at a level to yield at least about 0.5% by weight $Al^{+3}$ ion in the dispersion, based upon the weight of said vital wheat gluten taken as 100% by weight, said dispersion being essentially free of chlorophyll.

* * * * *